(12) United States Patent
Rosner (10) Patent No.: US 7,303,054 B2
(45) Date of Patent: Dec. 4, 2007

(54) POPULAR AMUSEMENT DEVICE WITH SWITCHABLE EDDY-CURRENT BRAKE

(76) Inventor: Peter Rosner, Gollierstrasse 70/C, Munich 80339 (DE)

( * ) Notice: Subject to any disclaimer, the term of this patent is extended or adjusted under 35 U.S.C. 154(b) by 0 days.

(21) Appl. No.: 10/496,466

(22) PCT Filed: Nov. 22, 2002

(86) PCT No.: PCT/EP02/13135

§ 371 (c)(1),
(2), (4) Date: May 24, 2004

(87) PCT Pub. No.: WO03/043865

PCT Pub. Date: May 30, 2003

(65) Prior Publication Data

US 2004/0262103 A1 Dec. 30, 2004

(30) Foreign Application Priority Data

Nov. 23, 2001 (DE) .......................... 201 19 119 U (51) Int. Cl.
*B60L 7/10* (2006.01)
(52) U.S. Cl. .......................... 188/159; 188/41; 188/164
(58) Field of Classification Search ................ 188/165, 188/180, 159, 161, 164, 41, 84; 104/250
See application file for complete search history.

(56) References Cited

U.S. PATENT DOCUMENTS

| | | | |
|---|---|---|---|
| 3,493,086 A | 2/1970 | Braun | |
| 3,625,317 A | 12/1971 | Baermann | |
| 3,723,795 A | 3/1973 | Baermann | |
| 3,837,442 A | 9/1974 | Baermann | |
| 4,482,034 A | 11/1984 | Baermann | |
| 5,018,605 A | 5/1991 | Hooghiem et al. | |
| 5,277,125 A * | 1/1994 | DiFonso et al. | ............ 104/292 |
| 6,293,376 B1 | 9/2001 | Pribonic | |
| 6,633,217 B2 * | 10/2003 | Post | ............................ 335/306 |
| 6,659,237 B1 * | 12/2003 | Pribonic | ....................... 188/165 |

FOREIGN PATENT DOCUMENTS

| | | |
|---|---|---|
| DE | 29 24 225 A | 12/1980 |
| WO | WO 96 32172 A | 10/1996 |

* cited by examiner

*Primary Examiner*—Bradley King
(74) *Attorney, Agent, or Firm*—Rothwell, Figg, Ernst & Manbeck (57) ABSTRACT

The invention relates to a popular amusement device with a personal transportation device, moving along a guide track arrangement (14), and eddy-current braking device (10, 70), comprising a magnet arrangement (10) and an induction body (70), for the selective braking of the personal transportation device, with one of the pieces of either the magnet arrangement (10) or the induction body (70) being provided on a guide track arrangement (14) and the other piece (10 or 70) being connected to the personal transportation device. The magnet arrangement (10) comprises at least two partial magnet arrangements (18, 20) each with at least one permanent magnet (74, 76, 78, 82, 84, 86), said partial magnet arrangements (18, 20) are, at least in the operating position thereof, arranged essentially orthogonal to the braking area guide track direction (B), at a separation (a) from each other, with the induction body (70) being arranged between the partial magnet arrangements (18, 20) during the braking. According to the invention, the partial magnet arrangements (18, 20) may be displaced relative to each other.

24 Claims, 4 Drawing Sheets

POPULAR AMUSEMENT DEVICE WITH SWITCHABLE EDDY-CURRENT BRAKE

This application is a 35 U.S.C. § 371 National Phase Entry Application from PCT/EP02/13135, filed Nov. 22, 2002, and designating the United States.

FIELD OF THE INVENTION

The present invention relates to a popular amusement device having a personal transportation device moving along a guide track arrangement and an eddy-current braking device comprising a magnet arrangement and an induction body for selective braking of the personal transportation device.

BACKGROUND OF THE INVENTION

To form a braking zone on the guide track arrangement, one of the parts, i.e., either the magnet arrangement or the induction body, is provided on the guide track arrangement while the other part is connected to the personal transportation device, and the magnet arrangement has at least two partial magnet arrangements, each having at least one permanent magnet, said partial magnet arrangements being arranged at a distance from one another and essentially perpendicular to the direction of the braking zone guide track in at least one of their operating positions, with the induction body being arranged between the partial magnet arrangements during braking.

Such a popular amusement device is disclosed in European Patent 0 820 333 B1. Use of permanent magnets in the magnet arrangement is desirable for safety reasons because in contrast with electromagnets, the magnetic field emanating from permanent magnets does not depend on a power supply and thus the eddy-current braking device continues to supply the desired braking force even in the event of a power failure. However, the variability, i.e., controllability, of the braking force of an eddy-current brake with permanent magnets is still a problem.

In the publication cited above, it is proposed that the entire magnet arrangement and the induction body be moved away from and toward one another in order to diminish or interrupt the braking force acting between the magnet arrangement and the induction body in the case of an eddy-current brake on a popular amusement device. To do so, the entire magnet arrangement and/or the induction body is situated movably on the device supporting it and is provided with an actuator drive.

One disadvantage of this method of varying a braking force of an eddy-current braking device is that the braking force acting between the magnet arrangement and the induction body can be adjusted only approximately and it can be used practically only between a predetermined braking position with a relatively high braking force and a zero braking force position with and without a negligible braking force.

Furthermore, when the magnet arrangement is moved away from the induction body to reduce the coverage between these two parts, relatively large masses are moved, which results in relatively long switching times, and shortening these times in turn requires efficient and expensive actuator drives.

SUMMARY OF THE INVENTION

The object of the present invention is thus to make available a popular amusement device of the type defined in the preamble in which the braking force acting between the magnet arrangement and the induction body is adjustable as rapidly and accurately as possible and with the lowest possible effort. This object is achieved by a popular amusement device of the generic type in which the partial magnet arrangements are movable in relation to one another.

The term "popular amusement device" refers here to transportation businesses in the broadest sense such as those associated with amusement parks, seasonal fairs and popular festivals. These include, for example, drop towers, the tunnel of horrors, roller coasters, etc.

The braking zone is an area of the guide track arrangement, preferably a continuous area, in which an eddy-current-based braking force can act between the magnet arrangement and the induction body. The braking zone includes at least the longitudinal section of the guide track in which one of the parts of the magnet arrangement or the induction body is arranged on it. The direction of the braking zone guide track is accordingly the direction of the path of the guide track arrangement in the braking zone.

Due to the mobility of the partial magnet arrangements in relation to one another with the resulting change in orientation of the magnetic field vectors, penetration of the induction body by the magnetic field emanating from the partial magnet arrangements and thus the extent of eddy-currents induced in the induction body, said eddy currents being proportional to the effective braking force, can be adjusted rapidly and accurately. In contrast with the state of the art, the total mass of the magnet arrangement is no longer moved to change the braking force but instead only a portion of it is moved.

A concrete possibility for influencing the creation of eddy currents in the induction body consists of varying the orthogonal distance from the direction of the braking zone guide track between the partial magnet arrangements through their movement in relation to one another. This may be accomplished, for example, by the fact that the partial magnet arrangements are pivotable in relation to one another about an axis that is essentially parallel to the direction of the braking zone guide track and/or they are linearly displaceable in relation to one another essentially orthogonally to the direction of the braking zone guide track. However, depending on the embodiment, a residual braking force may remain, although it is unwanted under some circumstances due to stray magnetic fields, and it may still be in effect between the magnet arrangement and the induction body.

To avoid this residual braking force and to increase the range of variability of the braking force, the popular amusement device is preferably designed so that the partial magnet arrangements can be displaced linearly in relation to one another with a displacement component that points essentially in the direction of the braking zone guide track. The distance between the partial magnet arrangements remains essentially unchanged as a result, with the only thing that changes being the relative position of the poles of the at least one permanent magnet of each of two partial magnet arrangements situated essentially opposite one another. This type of change in braking force requires only a short contact travel to change the braking force.

"Essentially in opposition" means that the at least two partial magnet arrangements at least partially overlap in a projection of the magnet arrangement in the distance direction of the parallel planes when the magnet arrangements are each in one of two parallel planes.

It is fundamentally conceivable for each partial magnet arrangement to have only one permanent magnet. In one case, starting from an opposition of one pole of the permanent magnet of one partial magnet arrangement and a pole of a different polarity of the permanent magnet arrangement of the other partial magnet arrangement, the braking force could be reduced starting from a maximum braking force by means of a linear displacement of the partial magnet arrangements in relation to one another. In another case, starting from an opposition of poles of the same polarity, the resulting braking force could be increased from a minimal braking force by a linear displacement of the partial magnet arrangements in relation to one another.

The resultant braking force may be increased by each partial magnet arrangement having a plurality of permanent magnets. Protection against power outages as mentioned previously can be achieved in the best possible way here by the fact that the magnet arrangement has exclusively permanent magnets as the magnets. In this case, even if there is a sudden total power outage, the personal transportation device can always be decelerated with maximum braking force.

In a particularly advantageous embodiment of an inventive popular amusement device, each partial magnet arrangement has a plurality of permanent magnets following one another in the direction of the braking zone guide track. This allows implementation of even longer braking zones in which a relatively high braking force may be in effect, which in turn permits a high allowed velocity of the personal transportation device prior to the respective braking zone, which thus increases the attractiveness of the popular amusement device. The braking force acting in the braking zone may be further increased by arranging a plurality of permanent magnets of each partial magnet arrangement with alternating polarities. This means that poles of different polarities follow one another in the direction of the braking zone guide track on an area of a partial magnet arrangement pointing to the other partial magnet arrangement.

An increased number of pole changes means that a higher maximum braking force can be achieved and also improves the variability of a desired braking force acting between the magnet arrangement and the induction body. By displacement of the partial magnet arrangements in relation to one another with a displacement component pointing essentially in the direction of the braking zone guide track, any braking force can be established between a maximum braking force and a virtually negligible minimal braking force. In the preferred embodiment discussed here, the direction of the braking zone guide track is the same as the direction of extent of the partial magnet arrangement. The required maximum displacement distance (contact travel) amounts to one pole pitch length.

The maximum braking force is achieved when as many permanent magnet poles as possible of the one partial magnet arrangement of permanent magnet poles of different polarities are arranged opposite another partial magnet arrangement. Magnetic field penetration of the induction body is at a maximum in this position during braking. The minimum braking force is obtained by analogy when as many permanent magnet poles as possible of the one partial magnet arrangement are arranged opposite permanent magnet poles of the same polarity of another partial magnet arrangement, which leads to minimum magnetic field penetration of the induction body during braking.

The phrase "as many as possible" takes into account the fact that even with an optimum design of the partial magnet arrangements in one of the two positions, namely maximum braking force position or minimum braking force position, at least one permanent magnet pole lying at one longitudinal end of a partial magnet arrangement in a direction of the braking zone guide track is not opposite any permanent magnet pole of another partial magnet arrangement.

A flexible variability of the braking force generated by the eddy-current braking device can be achieved by designing the popular amusement device so that the partial magnet arrangements are displaceable between two end positions in relation to one another, one end position of which is closer at a maximum braking force position and possibly coincides with it, and the other end position of which is closer at the minimum braking force position and optionally coincides with it.

Depending on the application, magnet arrangements and induction bodies may be distributed in any desired manner on a guide track arrangement and personal transportation device, As a rule, however, the magnet arrangement will have a greater mass than the induction body, and with many popular amusement devices, there is an emphasis on achieving the greatest possible acceleration of the passengers, so it is advantageous if the magnet arrangement is provided on the guide track arrangement and the induction body is provided on the personal transportation device. This distribution of the parts of the eddy-current braking device also has the advantage that a linear motor may be used to drive the personal transportation device, and the induction body may form part of the linear motor. Thus at least parts of the drive and the brake may be used jointly, which thus reduces the total number of parts required.

The safety of passengers using the particular device understandably plays a major role in public entertainment devices. The fact that the inventive eddy-current braking device is not sensitive to power failures has already been emphasized repeatedly. Although the magnetic field of the permanent magnets used cannot fail unforeseeably in the case of the public amusement device according to the present invention, it is, however, possible for an actuator drive that is used to generate the relative motion between the partial magnet arrangements to fail. Such an actuator drive may be, for example, a hydraulically or pneumatically operated piston-cylinder unit or an electric motor. However, in the event of failure of the actuator drive, if the magnet arrangement is not in the maximum braking force position, a restoring force of the partial magnet arrangement acting in the direction of a position of higher braking force, said restoring force caused by the magnetic field of the magnet arrangement, can be utilized. This is due to the fact that the minimum braking force position described above is a position of labile equilibrium, whereas the maximum braking force position described above is a position of stable equilibrium of the partial magnet arrangements in relation to one another.

This safety feature of the inventive popular amusement devices can be further improved by the fact that of the at least two partial magnet arrangements, a first is rigidly connected to the device supporting it and a second is connected to the device supporting it and is essentially orthogonally to the direction of the braking zone guide track at a distance from the first arrangement, so that it is linearly displaceable with a displacement component pointing essentially in the direction of the braking zone guide track, with a displacement limiting device cooperating with the second partial magnet arrangement, preventing displacement of the second partial magnet arrangement in a relative direction of movement of the induction body in relation to the magnet arrangement beyond the end position closer to the maximum braking force position and from this end position outward against the direction of relative movement. In this case, not only is there a restoring force induced by the magnet arrangement itself acting in the direction of positions of greater braking force between the partial magnet arrangements but also there is a braking response force acting on the partial magnet arrangements in braking as an additional restoring force component.

The relative direction of motion provided is the direction in which the induction body passes through the braking zone of the guide track arrangement in relation to the magnet arrangement. The displacement limiting device defines a position having a relatively high braking force, if desired having the maximum braking force, into which the restoring force restores the second partial magnet arrangement and in which it then remains. This displacement limiting device may be formed by a mechanical stop in a simple manner.

It is essentially possible for the at least two partial magnet arrangements to be arranged so that they are linearly displaceable in relation to one another with a displacement component essentially in the direction of the braking zone guide track; this is done by providing linear guides on one or both partial magnet arrangements. An especially simple and inexpensive design option for implementing said linear displaceability of the at least two partial magnet arrangements in relation to one another is to connect at least one of the at least two partial magnet arrangements to another of the at least two partial magnet arrangements or to a framework via a parallelogram crank mechanism. With this type of structural design of the magnet arrangement having its own inventive value, the partial magnet arrangement coupled to the parallelogram crank mechanism has a displacement component directed orthogonally to the displacement component pointing in the direction of the braking zone guide track in the case of a relative movement with respect to the other partial magnet arrangement. Only rotary bearings such as friction bearing bushes or roller bearings are needed on the displaceable partial magnet arrangement.

BRIEF DESCRIPTION OF THE DRAWINGS

The present invention is described in greater detail below on the basis of the accompanying drawing, which shows.

DETAILED DESCRIPTION OF THE PREFERRED EMBODIMENTS

Figure 1:
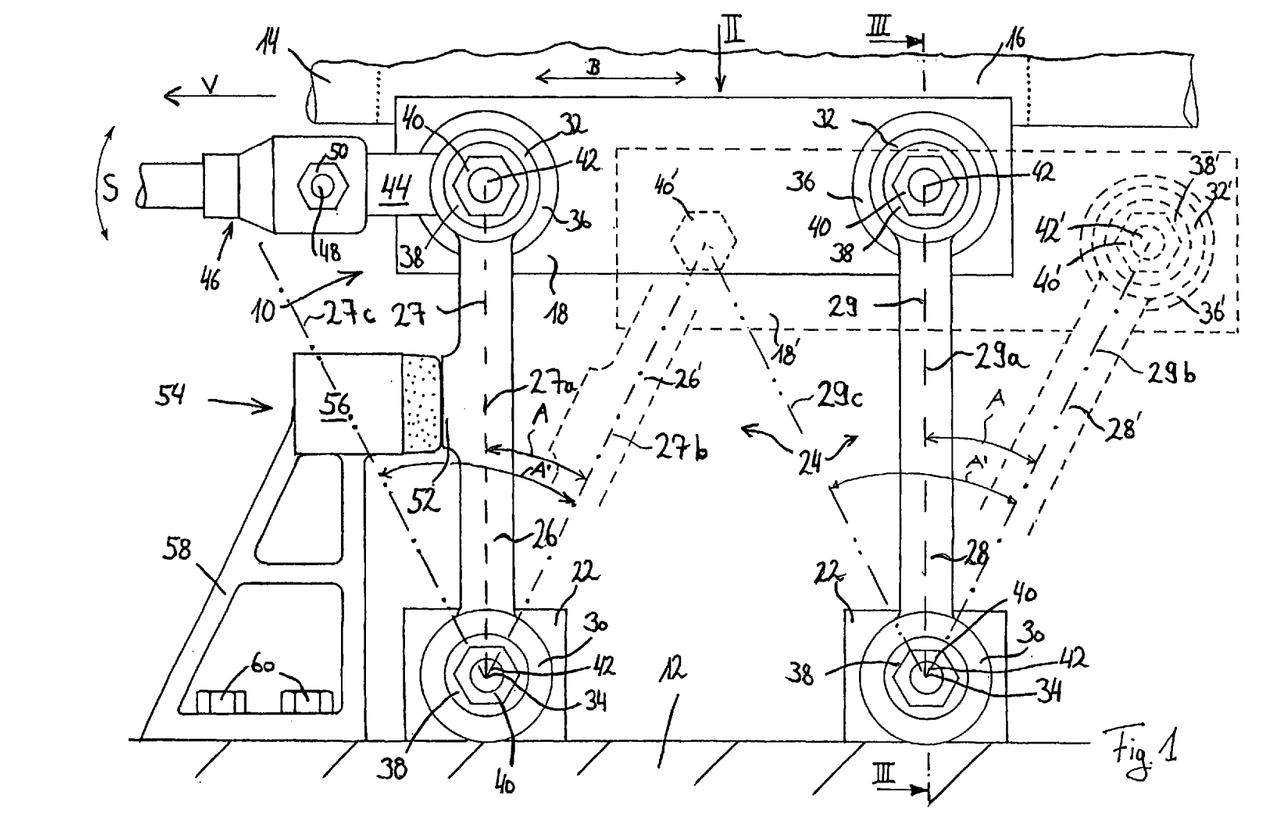
FIG. 1 a magnet arrangement of an eddy-current braking device of a popular amusement device according to this invention in a maximum braking force position (solid line) and in a minimum braking force position (dashed line), FIG. 2 a view in the direction of the arrow II in FIG. 1 of the magnet arrangement shown in FIG. 1 in the maximum braking force position with the induction body, FIG. 3 a sectional view of the magnet arrangement shown in FIG. 1 with an induction body in the maximum braking force position along line III-III in FIG. 1 and FIG. 4 a view of the magnet arrangement shown in FIG. 1, where this view corresponds to that in FIG. 2, showing the induction body in the minimum braking force position.

FIG. 1 shows a side view of a magnet arrangement 10 provided on a roller coaster track. The magnet arrangement 10 is connected to a frame 12 which also carries the guide track arrangement of the roller coaster track. The guide track arrangement is formed by a rail system 14, which is indicated only schematically in FIG. 1. Cars of roller coaster trains (not shown) travel along this rail system 14 in the direction of arrow V.

Due to the magnet arrangement 10, a braking zone 16 is formed on the rail system 14, extending slightly beyond both longitudinal ends of the magnet arrangement 10, because of the scattering field that emanates from the magnet arrangement 10. The effective range of the braking zone 16 is indicated by the dotted lines in FIG. 1. Accordingly, the direction of the braking zone guide track is the direction of extent of the rail system 14 within the braking zone 16. This is indicated with the double arrow B in FIG. 1.

The magnet arrangement 10 includes two partial magnet arrangements designed as magnetic strips 18 and 20. FIG. 1 shows only the magnetic strip 18, but the magnetic strip 20 is covered by it. Although the magnetic strip 20 is rigidly connected by the magnetic strip holder 22 to the frame 12 of the guide track arrangement, the magnetic strip 18 is displaceable in relation to the magnetic strip 20 by a parallelogram crank mechanism 20 with at least one displacement component pointing essentially in the direction B of the braking zone guide track. More precisely, the magnetic strip 18 is displaceable with respect to the magnetic strip 20 in a plane orthogonal to the distance direction between the magnetic strips 18 and 20. The term "distance direction" is understood to refer to the distance between two parallel planes in which the magnetic strips 18 and 20, respectively, are situated. The displacement plane of the magnetic strip 18 as well as the planes in which the magnetic strips 18 and 20 are situated are parallel to the plane of the drawing in FIG. 1.

The parallelogram crank mechanism is formed by control arms 26 and 28, and on each of the longitudinal ends of said control arms, a ring bushing 30 is formed on the frame end and a ring bushing 32 is formed on the magnetic strip end. The ring bushing 30 on the frame end surrounds a friction bearing (not shown in FIG. 1) which in turn surrounds a bolt 34 situated on the magnetic strip holder 22 (see also FIG. 3). Control arms 26 and 28 can rotate about this bolt 34.

By analogy, the ring bushings 32 on the magnetic strip end of the control arms 26 and 28 surround friction bearings (not shown in FIG. 1) which in turn surround bolts 36 on the magnetic strips 18 and 20. The ring bushings 30 and 32 are secured on the bolts 34 and 36 by washers 38 and nuts 40, which are screwed onto the thread 42 formed on the bolts.

By means of the parallelogram crank mechanism 24, the magnetic strip 18 can be displaced in parallel in the displacement plane described above in a range defined by the length of the control arms 26 and 28 without any change in its orientation in the direction B of the braking zone guide track. FIG. 1 shows the maximum braking force position of the magnetic strip with a solid line and the minimum braking force position of the magnetic strip 18 with a dotted line. The dotted line in FIG. 1 is labeled with the same reference notation with an added prime (').

A projection 44 pointing in the direction of movement V of the roller coaster train is designed on the ring bushing 32 on the magnetic strip end of the control arm 36, said projection being surrounded by a fork-like end part 36 of a hydraulically or preferably pneumatically actuated piston-cylinder unit. The end part 46 is attached to the projection 44 by a screw 48 and a nut 50 so that it has one swiveling degree of freedom in the direction of the double arrow S with respect to the projection 44. By displacement of the piston rod of the piston cylinder unit, the magnet strip 18 can be moved starting from the maximum braking force position shown with a solid line in FIG. 1 and moved against the direction of travel V of the roller coaster train into any desired position of a lower braking force. The magnetic strip 18 may of course be moved out of any position of a lower braking force into a position of a higher braking force by tightening the piston rod and/or to the position of maximum braking force.

A stop surface 52 is formed on the control arm 26 on its end which points in the direction of travel V; in the case depicted here this stop surface comes to rest against a stop 54 that is fixedly attached to the frame in the maximum braking force position. The stop fixedly mounted on the frame is formed by a damping element holder 56 that is fixedly connected to the frame 12 of the guide track arrangement via a framework 58 and screws 60. To absorb the impact momentum of the control arm 26 on the stop 54 that is fixedly mounted on the frame, a damping element 62 is situated on the damping element holder 56 pointing toward the control arm 26.

Figure 2:
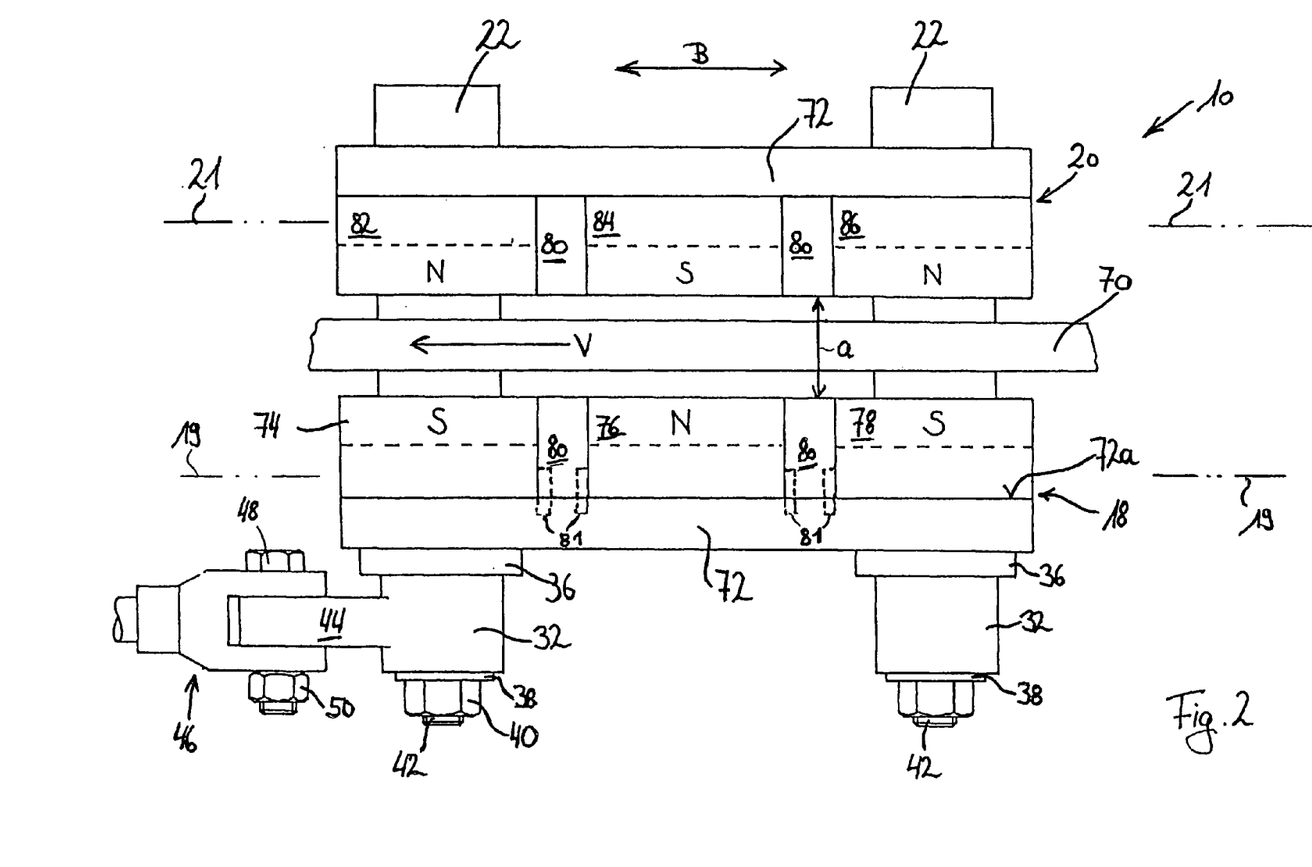
Figure 4:
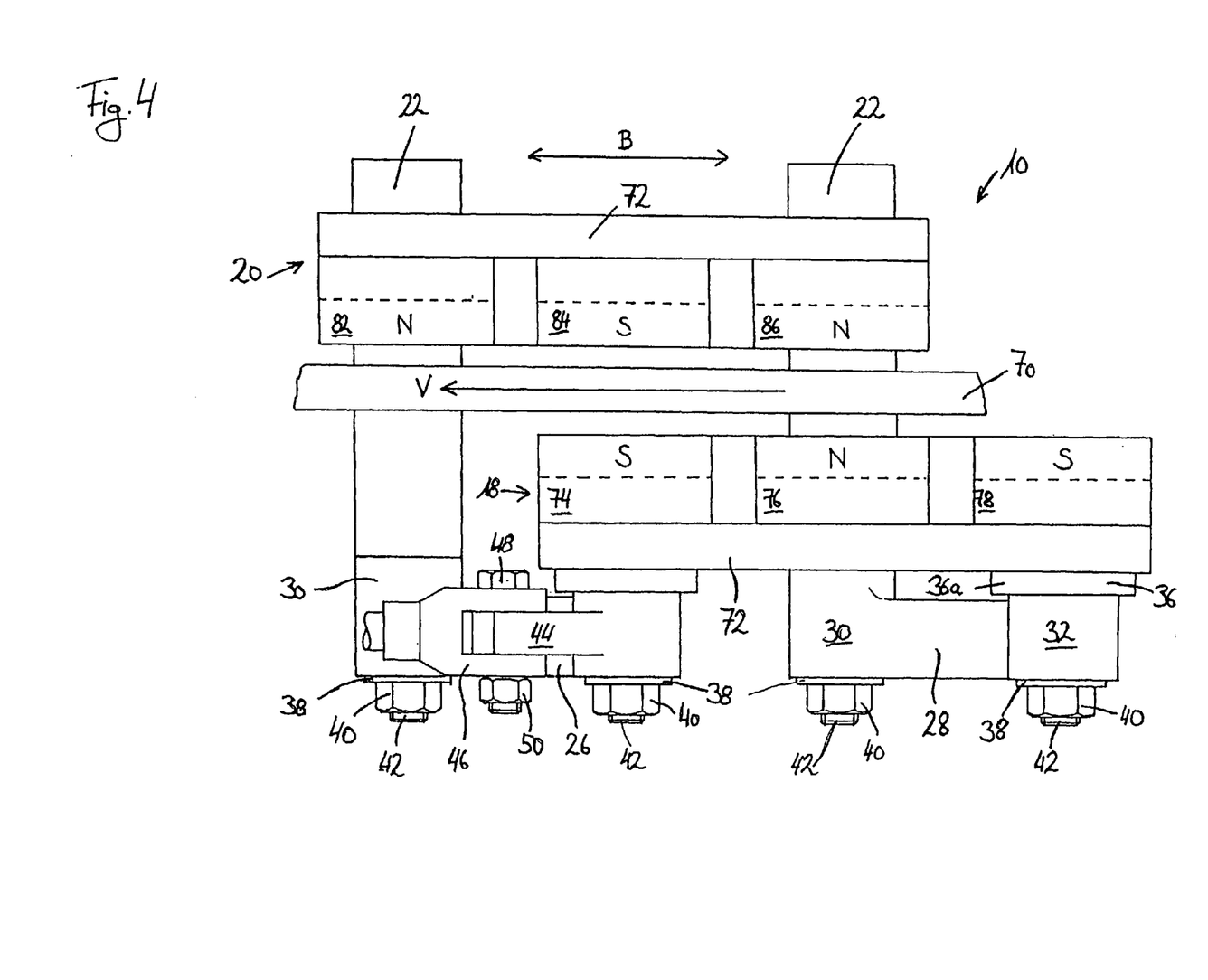

From the maximum braking force position according to FIGS. 1 and 2, the magnetic strip 18 may thus be displaced selectively into the minimum braking force position according to FIG. 4 (shown with a dotted line in FIG. 1) by putting the pneumatic piston cylinder unit under pressure or optionally it may also be displaced into the desired intermediate positions for precision metering of the braking force. A reverse movement into the maximum braking force position is achieved by a corresponding reduction in the pneumatic pressure in the piston-cylinder unit, optionally by opening a corresponding vent valve. The magnetic forces acting between the two magnetic strips 18 and 20 acts as the restoring force; these magnetic forces act in the direction of travel V until the north and south poles of the individual magnets of the two magnetic strips 18 and 20 are each opposite poles of the opposite polarity of the other strip (=maximum braking force position according to FIGS. 1 and 2).

As an additional safety measure, two parallel-connected vent valves may also be connected to the piston-cylinder unit in a manner not shown here, so that in the event of failure of one of the two valves, the other valve will in any case ensure restoration back to the maximum braking force position. It is thus sufficient for the piston-cylinder unit to be designed to be only single acting. In cases where it is necessary not only to switch between zero braking force and maximum braking force, but where precision braking force control and/or braking force regulation is also important, a double-acting piston-cylinder unit may also be used, preferably with hydraulic triggering.

As shown in FIG. 1, the magnetic strip 18 can be moved between the two positions, i.e., the maximum braking force position and the minimum braking force position, as indicated by a double arrow A between the corresponding angular positions 27a and 27b and 29a and 29b of a longitudinal axis 27 of the control arm 26 and/or a longitudinal axis 29 of the control arm 28. In the angular positions 27a and 29a, the longitudinal axis is essentially orthogonal to the direction of travel V (and to the direction B of the braking zone guide track).

In deviation from this, however, another possible arrangement is one where the maximum braking force position is in mirror symmetry (with respect to a plane perpendicular to the direction of travel V) to the minimum braking force position. The corresponding angle positions 27c and 29c of the longitudinal axis 27 and 29, respectively, in the maximum braking force position are indicated with a dash-dot-dot line in FIG. 1. The resulting swivel angle range, which is twice as large, is represented by a double arrow A'. Similarly, the stationary magnetic strip 20 is shifted to the left in FIGS. 1, 2 and 4 so that in the maximum braking force position the desired precise opposition of magnetic poles of different polarities is obtained.

The structural design of the magnet arrangement 10 in combination with the stop 54 which is fixedly mounted on the frame and the adjustment of the magnetic strip 18 opposite the direction of travel V of the roller coaster train toward diminishing effective braking forces constitutes an important safety feature of this preferred embodiment. Braking response forces acting on the magnetic strip 18 are introduced directly into the stop 54 which is mounted fixedly on the frame in the maximum braking force position. If the magnetic strip 18 is still in its maximum braking force position in the braking operation, regardless of the reason, then the braking response force supports the magnetic restoration to the stable end position, said restoration acting between the magnetic strips 18 and 20. In other words, if the induction body 70 travels between the two magnetic strips 18 and 20 in the direction of travel V, then a braking force which acts against the direction of travel V acts on the induction body. Accordingly, a braking reaction force which acts in the direction of travel V, i.e., opposite the braking force which acts on the induction body, is acting on each of the magnetic strips. Under some circumstances, this may reset the magnetic strips until striking the stop 54 which is fixedly mounted on the frame, where it reaches the maximum braking force position and remains in this position for the duration of the braking period.

FIG. 2 shows a view of the magnet arrangement shown in FIG. 1 from the standpoint of the arrow II in FIG. 1. In contrast to FIG. 1, this shows an induction body 70 between the magnetic strips 18 and 20, fixedly connected to the car (not shown) that is traveling on the rail system 14. The stop 54 mounted fixedly on the frame is not shown in FIG. 2 for the sake of simplicity. FIG. 2 shows the maximum braking force position of the magnet arrangement 10.

As FIG. 2 shows, the magnetic strips 18 and 20 are arranged essentially parallel to one another with a distance a, which is essentially orthogonal to the direction B of the braking zone guide track. In the example shown here, the magnetic strip 18 is in the plane 19 and the magnetic strip 20 is in the plane 21 which is parallel to the plane 19. The two planes 19 and 21 are orthogonal to the plane of the drawing in FIG. 2. The distance a is greater than the width of the induction body 70 in the distance direction to leave an air gap between the magnetic strips 18 and 20 and the induction body 70 in braking. This air gap is necessary for preventing material friction between the induction body and a magnetic strip 18 or 20, among other things. In addition, transverse movements of the induction body 70 may occur in the braking of the roller coaster train. Therefore, the air gap should be large enough so that this transverse movement is possible without contacting a magnetic strip.

The magnetic strips 18 and 20 are essentially identical in design. In the following discussion, only the magnetic strip will be described, but this description likewise applies to the magnetic strip 20.

The magnetic strip 18 consists of a magnet holder 72 which is preferably made of a ferromagnetic material to produce a magnetic return. For example, three permanent magnets 74, 76 and 78 are attached to the surface 72a which faces toward the other magnetic strip, namely magnetic strip 20 in this case. If higher braking forces are desired, a greater number of permanent magnets may also be used.

In the case of a braking device for a roller coaster train, in general five to ten magnets are used per magnetic strip. The permanent magnets are attached to the respective magnet holder by casting them with synthetic resin. The permanent magnets are secured in place before casting by using securing pins 81 which are inserted into corresponding boreholes in the respective magnet holder 72 and are in contact with the outside circumference of the permanent magnets.

The permanent magnets 74, 76 and 78 are attached to the magnet holder 72 in such a way that one pole of each permanent magnet points toward the magnet holder 72 and the other pole points away from the magnet holder 72 toward the other magnetic strip. To increase the braking force that can be achieved by the magnet arrangement 10 and the induction body 70, the permanent magnets 74, 76 and 78 of the magnetic strip 18 are arranged with alternating polarities in the direction B of the braking zone guide track, i.e., any permanent magnet of the magnetic strip 18 is arranged so that it is rotated by 180° about an axis oriented in the direction B of the braking zone guide track with respect to a permanent magnet adjacent thereto in the direction of the braking zone guide track.

The permanent magnets 82, 84 and 86 of the magnet holder 72 of the magnetic strip 20 are arranged essentially in the same way as the permanent magnets 74, 76 and 78 but with the opposite polarity on the magnet holder 72 of the magnetic strip 20. In the maximum braking force position of the magnet arrangement 10 shown in FIG. 2, a north pole of the permanent magnet 82 of the magnetic strip 20 is opposite a south pole of the permanent magnet 74 of the magnetic strip 18. A corresponding arrangement also applies to the permanent magnet 76 to 84 and 78 to 86.

It should be pointed out here that the magnetic strips 18 and 20 in this exemplary embodiment are shown with their length shortened. The magnetic strips may in reality be designed to be longer and may have more than three permanent magnets. Likewise more than two control arms may also be provided.

Figure 3:
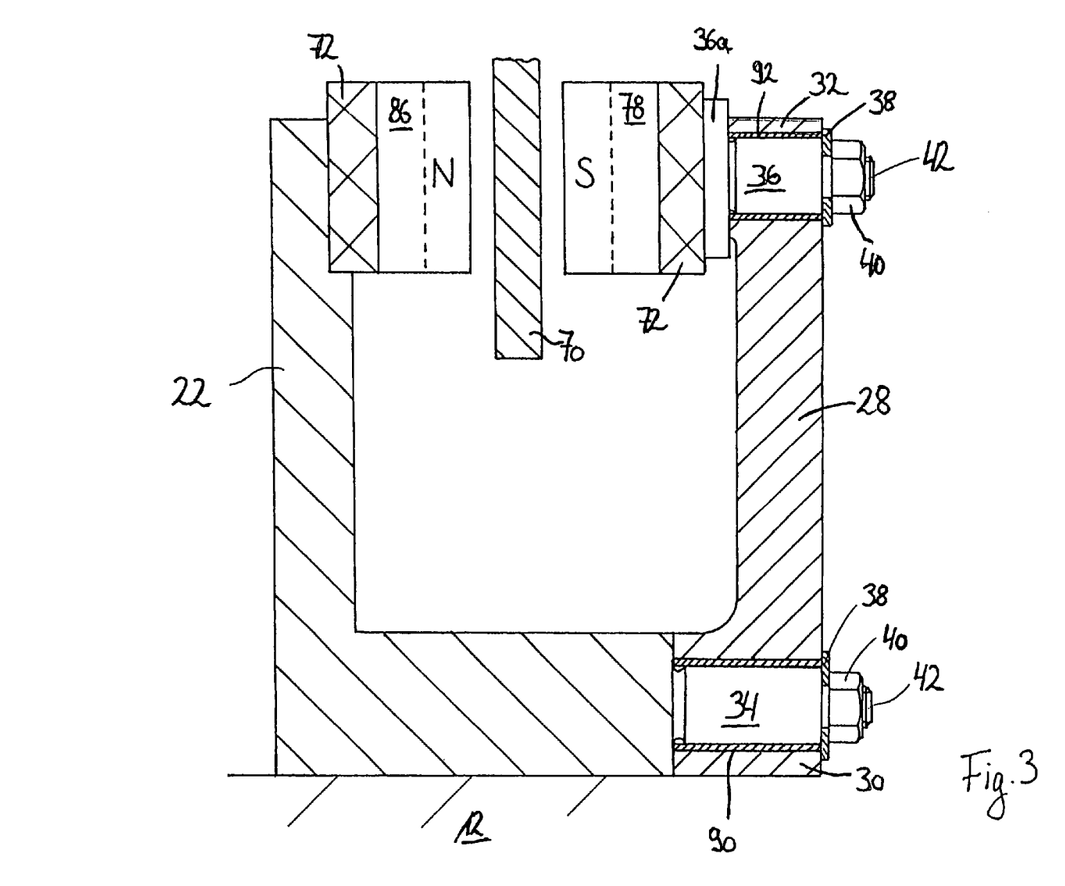

FIG. 3 shows a sectional view along line III-III in FIG. 1. This shows mainly the design of the control arm 28.

Between the inside circumferential wall of the ring bushing 30 on the frame end and the bolt 34, a sliding bushing 90 is situated as the sliding bearing, surrounding the bolt 34. The sliding bushing 90 is made of a material which forms a favorable friction pairing with the bolt 34. For example, the sliding bushing 90 may be made of bronze when the bolt 34 is a steel bolt. The bolt 34 may be welded to the magnetic strip holder 22.

The rotary mounting on the bolt 36 with the ring bushing 32 on the magnetic strip end is designed in the same way as the rotary bearing on the bolt 34. The sliding bushing 92, which is also used there, should be selected from the standpoint of a good friction pairing with the bolt 36. The bolt 36 is attached to the magnet holder 72 by a flange section 36a, e.g., by screwing and/or gluing.

For the sake of thoroughness, FIG. 4 shows a view of the magnet arrangement 10 in the direction of arrow II from FIG. 1 (this view corresponding to that in FIG. 2) in its minimum braking force position.

In the position illustrated in FIG. 4, the permanent magnet 80 of the magnetic strip 20 is opposite the permanent magnet 74 of the magnetic strip 18 and another permanent magnet pairing is formed from magnets 76 and 78. Poles of the same polarity are now opposite one another so that the induction body that moves between the magnetic strips 18 and 20 in the direction of travel V in braking is hardly penetrated by a magnetic field emanating from the magnetic strips 18 and 20. A stray field may emanate from the magnets 78 and 82 on one longitudinal end of the magnetic strips 18 and 20, penetrating through the induction body 70 and thus ensuring a slight braking. This residual braking force occurs because no pole of the same polarity of another magnet is opposite said magnet.

The invention claimed is:

1. Magnet arrangement of an eddy-current braking device comprising:
    a first partial magnet arrangement comprising a plurality of permanent magnets, rigidly connected to a frame;
    a second partial magnet arrangement comprising a plurality of permanent magnets, connected to the frame (12) at a distance (a) from the first partial magnet arrangement (20) so that said second partial magnet arrangement is displaceable between two end positions in relation to the first partial magnet arrangement (20) with along a displacement path that is essentially orthogonal to the distance (a), one end position being closer at a maximum braking force position and the other end position being closer at a minimum braking force position, wherein the minimum braking force position is a position of labile equilibrium of the partial magnet arrangements in relation to one another, and the maximum braking force position is a position of stable equilibrium of the partial magnet arrangements in relation to one another;
    a displacement limiting device (54) that cooperates with the second partial magnet arrangement (18) and prevents displacement of the second partial magnet arrangement (18) in relation to the first partial magnet arrangement (20) beyond the end position closer to the maximum braking force position and permits displacement out of this end position in the opposite direction; and
    an actuator for displacing said second partial magnet arrangement along said displacement path to a selected position between and including said end positions to change the braking force by changing the relative position of the poles of the permanent magnets of each of said first and second partial magnet arrangements.

2. Magnet arrangement according to claim 1, characterized in that the displacement limiting device (54) is formed by a mechanical stop (54).

3. Magnet arrangement according to claim 1, characterized in that the second partial magnet arrangement (18) of the at least two partial magnet arrangements (18, 20) is connected to the frame (12) by a parallelogram crank mechanism (24).

4. Magnet arrangement according to claim 1, characterized in that said magnet arrangement has only permanent magnets (74, 76, 78, 82, 84, 86) as magnets (74, 76, 78, 82, 84, 86).

5. Magnet arrangement according to claim 4, characterized in that the permanent magnets (74, 76, 78, 82, 84, 86) of each partial magnet arrangement (18, 20) are arranged so that they follow one another in a direction essentially orthogonal to the distance (a).

6. Magnet arrangement according to claim 1, wherein the one end position that is closer at a maximum braking force position coincides with the maximum braking force position, and the other end position that is closer at the minimum braking force position coincides with the minimum braking force position.

7. Magnet arrangement according to claim 4, characterized in that the permanent magnets (74, 76, 78, 82, 84, 86)

of each partial magnet arrangement (18, 20) are arranged so that they follow one another in a direction essentially orthogonal to the distance (a), with an alternating polarity.

8. Popular amusement device according to claim 1, wherein an actuator drive is provided to generate the relative motion between the first and the second partial magnet arrangements.

9. Magnet arrangement of an eddy-current braking device, having at least two partial magnet arrangements (18, 20), each partial magnet arrangement comprising a plurality of permanent magnets, arranged at a distance (a) from one another and are movable in relation to one another, wherein at least one partial magnet arrangement (18) of the at least two partial magnet arrangements (18, 20) is connected to another of the at least two partial magnet arrangements (20) or to a frame (12) by a parallelogram crank mechanism (24), said parallelogram crank mechanism being coupled with an actuator for translatorily moving said at least one partial magnet arrangement along a displacement path essentially orthogonal to said distance (a) to a selected position between and including a minimum braking force position and a maximum braking force position in order to change a position of a pole of at least one permanent magnet of said at least one partial magnet arrangement relative to that of at least one permanent magnet of said another partial magnet arrangement of the at least two partial magnet arrangements, wherein the minimum braking force position is a position of labile equilibrium of the partial magnet arrangements in relation to one another, and the maximum braking force position is a position of stable equilibrium of the partial magnet arrangements in relation to one another.

10. Popular amusement device comprising:
a personal transportation device movable along a guide track arrangement;
an eddy-current braking device comprising a magnet arrangement and an induction body for selective braking of the personal transportation device, said magnet arrangement including a first partial magnet arrangement comprising a plurality of permanent magnets and a second partial magnet arrangement comprising a plurality of magnets, cooperating to form a braking zone on the guide track arrangement, wherein one of the magnet arrangement or the induction body is provided on the guide track arrangement while the other of the magnet arrangement or the induction body is connected to the personal transportation device, said first and second partial magnet arrangements being arranged at a distance (a) from one another, said distance (a) being essentially orthogonal to the direction (B) of the braking zone guide track in at least one of the operating positions of said first and second partial magnet arrangements, with the induction body being arranged between the first and second partial magnet arrangements during braking, said first partial magnet arrangement being rigidly connected to a supporting device;
an actuator for displacing said second partial magnet arrangement translatorily to a selected position between and including first and second end positions essentially in the direction (B) of the braking zone guide track, said first end position being closer to a maximum braking force position and said second end position being closer to the minimum braking force position, wherein the minimum braking force position is a position of labile equilibrium of the partial magnet arrangements in relation to one another, and the maximum braking force position is a position of stable equilibrium of the partial magnet arrangements in relation to one another, wherein the translatory displacement of said second partial magnet arrangement changes the braking force by changing the relative position of the poles of the at least one permanent magnet of each of said first and second partial magnet arrangements; and
a displacement limiting device cooperating with the second partial magnet arrangement, to prevent displacement of the second partial magnet arrangement in a relative motion direction (V) of movement of the induction body beyond the first end position closer to the maximum braking force position, and to allow displacement in a direction opposite the relative motion direction (V).

11. Popular amusement device according to claim 10, characterized in that each partial magnet arrangement (18, 20) has a plurality of permanent magnets (74, 76, 78, 82, 84, 86).

12. Popular amusement device according to claim 11, characterized in that the permanent magnets (74, 76, 78, 82, 84, 86) of each partial magnet arrangement (18, 20) follow one another in the direction (B) of the braking zone guide track.

13. Popular amusement device according to claim 11, characterized in that the permanent magnets (74, 76, 78, 82, 84, 86) of each partial magnet arrangement (18, 20) follow one another in the direction (B) of the braking zone guide track, with an alternating polarity.

14. Popular amusement device according to claim 10, characterized in that the magnet arrangement (10) has only permanent magnets (74, 76, 78, 82, 84, 86) as magnets (74, 76, 78, 82, 84, 86).

15. Popular amusement device according to claim 10, characterized in that the magnet arrangement (10) is provided on the guide track arrangement (14) and the induction body (70) is provided on the personal transportation device.

16. Popular amusement device according to claim 15, further comprising a linear motor for driving the personal transportation device, with the induction body (70) forming part of the linear motor.

17. Popular amusement device according to claim 10, characterized in that the displacement limiting device (54) is formed by a mechanical stop (54).

18. Popular amusement device according to claim 10, wherein the one end position that is closer at a maximum braking force position coincides with the maximum braking force position, and the other end position that is closer at the minimum braking force position coincides with the minimum braking force position.

19. Popular amusement device according to claim 10, wherein an actuator drive is provided to generate the relative motion between the first and the second partial magnet arrangements.

20. A method for operating an eddy-current braking device comprising a first partial magnet arrangement comprising a plurality of permanent magnets rigidly connected to a frame, a second partial magnet arrangement comprising a plurality of permanent magnets connected to the frame at a distance (a) from the first partial magnet arrangement so that said second partial magnet arrangement is translatorily displaceable between two end positions in relation to the first partial magnet arrangement along a displacement path that is essentially orthogonal to the distance (a), one end position being closer at a maximum braking force position and the other end position being closer at the minimum braking force position, wherein the minimum braking force position is a position of labile equilibrium of the partial magnet arrangements in relation to one another, and the maximum braking force position is a position of stable equilibrium of the partial magnet arrangements in relation to one another, said method comprising the steps of:

moving said second partial magnet arrangement along said displacement path to a selected position between and including said two end positions in order to change the braking force by changing the relative position of the poles of the permanent magnets of each of said first and second partial magnet arrangements.

21. An eddy-current brake for inducing a braking force in an induction member, said eddy-current brake comprising:

a pair of opposed magnet strips arranged essential parallel to one another separated by a distance (a) forming a braking zone through which the induction body can travel, each strip including a plurality of permanent magnets;

an actuator mechanically coupled with a first magnet strip of said pair and configured to move said first magnet strip between a first selected position closer to a position of maximum braking force along a direction generally parallel to lengths of said pair of magnet strips and a second selected position closer to a position of minimum braking force;

wherein a maximum number of said permanent magnets having opposing polarity are substantially aligned in said position of maximum braking force and a maximum number of said permanent magnets having a same polarity are substantially aligned in said position of minimum braking force.

22. The eddy-current brake as recited in claim 21, wherein each said strip includes a same number of magnets alternating in polarity along the length of each said strip.

23. The eddy-current brake as recited in claim 21, wherein each said strip includes at least three magnets.

24. The eddy-current brake as recited in claim 21, wherein each said strip includes at least five magnets.

\* \* \* \* \*